R. F. SCHNEIDER.
CLINICAL THERMOMETER.
APPLICATION FILED MAY 17, 1910.

994,482.

Patented June 6, 1911.

WITNESSES:
G. V. Rasmussen
John A. Schwenteck

INVENTOR
Ralph F. Schneider
BY
Briesen & Knauth
ATTORNEYS

UNITED STATES PATENT OFFICE.

RALPH F. SCHNEIDER, OF NEW YORK, N. Y., ASSIGNOR TO CHARLES J. TAGLIABUE, OF BROOKLYN, NEW YORK.

CLINICAL THERMOMETER.

994,482.   Specification of Letters Patent.   Patented June 6, 1911.

Application filed May 17, 1910. Serial No. 561,820.

*To all whom it may concern:*

Be it known that I, RALPH F. SCHNEIDER, a citizen of the United States, and resident of the borough of Bronx, city, county, and State of New York, have invented a certain new and useful Improvement in Clinical Thermometers, of which the following is a specification.

My invention relates to clinical thermometers and has for its object to improve the construction thereof so as to render such thermometers capable of being accurately used by inexperienced persons. To this end the usual scale instead of being continuous as heretofore is divided at a point above which the graduations indicate fever or an abnormal temperature and the two parts of said scale placed out of alinement with each other. To further insure correct readings the portion of the scale indicating abnormal temperature is marked with a proper phrase or other mark indicating its character. Also if desired the thermometer tube may be rendered opaque at the portions adjacent to the respective scale parts so that the mercury column when it rises above the normal temperature mark will have the appearance of two columns one of which is opposite the normal scale and the other of which is opposite the abnormal or fever scale.

Other objects of my improvement will appear from the description hereinafter and the features of novelty will be pointed out in the appended claims.

Reference is to be had to the accompanying drawings in which—

Figure 1:
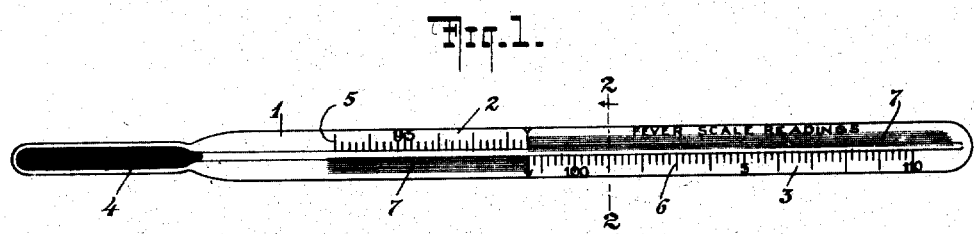
Figure 2:
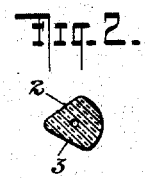
Figure 3:
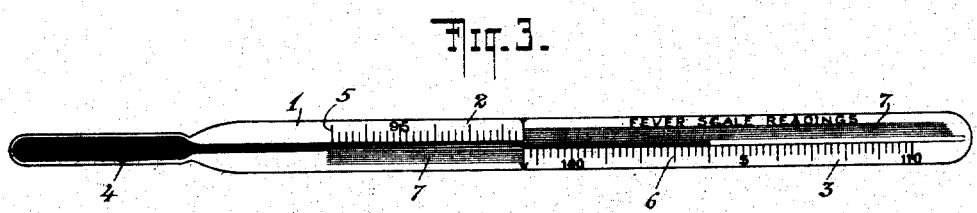

Figure 1 is an elevation of a clinical thermometer, constructed according to my invention; Fig. 2 is a cross section thereof on the line 2—2 of Fig. 1; and Fig. 3 is a view similar to Fig. 1 with the mercury above the normal mark.

In the drawings 1 represents the thermometer tube which is preferably provided with two plane surfaces 2 and 3 oppositely inclined or converging away from the center or axis of said tube and formed with the usual central longitudinal channel connected with the mercury bulb 4 located at one end of said tube. The surface 2 is provided near the bulb end of the tube with a portion of the usual scale 5 comprising the graduations indicating normal temperature and reading up to ninety eight and three-fifths degrees which is substantially the limit of normal temperature. The remainder of the scale or fever scale 6 is produced on the surface 3 and begins with the graduation indicating ninety eight and four-fifths degrees and extends to one hundred and ten degrees. Preferably this last portion of the scale or fever scale 6 is of a different color from that in which the graduations indicating the normal scale are produced so that the different portions will be clearly apparent without the necessity for close inspection. To further aid the inexperienced user the words "Fever scale readings" may appear on the surface 2 immediately adjacent or above the portion 6 of said scale preferably in the same color as said portion 6.

In order to still further minimize the danger of confusion in the reading, the portion of the surface 3 adjacent to the scale 5 and the portion of the surface 2 adjacent to the fever scale 6 (being the portions where they bear no scale) may be rendered opaque in any suitable manner as by etching, grinding or otherwise as indicated at 7. These opaque portions extend toward each other on opposite sides of an axial line to a common point and serve to partly obscure the mercury thread as it gradually rises. With this construction the mercury column will appear opposite the center of the portion 2 as long as no fever is evident and will also appear opposite the center of the surface 3 the moment the said column rises above the normal temperature mark. This is occasioned by the fact that the eye cannot penetrate the opaque portions of the inclined portions 2 and 3 and gives the mercury column the appearance of two columns as shown in Fig. 3. Thus if on examination no mercury can be seen opposite the indications on the surface 3 it is evident that no fever exists in the patient and it is unnecessary to carefully note the temperature indicated, whereas the moment the mercury column rises above the opaque portion of the surface 3 the same will be clearly visible opposite the scale 6 and the indicated degrees of temperature may be read without trouble.

My invention is particularly adapted for household use by persons other than physicians who are inexperienced in the reading of said thermometers and is extremely valuable to physicians as it makes possible a quick and accurate reading without the necessity for careful positioning and inspection of the thermometer.

Various changes in the specific form shown and described may be made within the scope of the claims without departing from the spirit of my invention.

The term converging as used in the specification and claims is to be understood as covering curved or other surfaces.

I claim:

1. A clinical thermometer comprising a tube having opaque portions arranged out of alinement with each other so as to partly conceal the mercury thread.

2. A clinical thermometer comprising a tube having opaque portions extending lengthwise thereof on opposite sides of an axial line, so as to partly conceal the mercury thread.

3. A clinical thermometer comprising a tube having opaque portions extending lengthwise thereof on opposite sides of an axial line, so as to partly conceal the mercury thread and scale portions arranged opposite each opaque portion.

4. A clinical thermometer comprising a tube having opaque portions extending lengthwise thereof on opposite sides of an axial line and toward each other to a common point so as to partly conceal the mercury thread and a scale portion opposite each opaque portion.

5. A clinical thermometer comprising a tube having an opaque portion on the reading side thereof, said opaque portion extending lengthwise of said tube and having its one end at a predetermined point intermediate of the ends of the scale, said opaque portion being arranged to partly conceal a portion of the width of the mercury thread.

In testimony whereof I have hereunto set my hand in the presence of two subscribing witnesses.

RALPH F. SCHNEIDER.

Witnesses:
JOHN A. KEHLENBECK,
M. H. LOCKWOOD.